June 10, 1947. C. A. G. PRITCHARD 2,422,039
CLAMPING MEANS
Filed May 18, 1944 3 Sheets-Sheet 1

INVENTOR:
CHARLES A. G. PRITCHARD
BY Saywell and Wesseler
ATTORNEYS

June 10, 1947.  C. A. G. PRITCHARD  2,422,039
CLAMPING MEANS
Filed May 18, 1944   3 Sheets-Sheet 2

INVENTOR:
CHARLES A. G. PRITCHARD
BY Saywell and Wesseler
ATTORNEYS

June 10, 1947.　　　C. A. G. PRITCHARD　　　2,422,039
CLAMPING MEANS
Filed May 18, 1944　　　3 Sheets-Sheet 3

INVENTOR:
CHARLES A. G. PRITCHARD

BY Saywell and Wesseler
ATTORNEYS

Patented June 10, 1947

2,422,039

UNITED STATES PATENT OFFICE 2,422,039

CLAMPING MEANS

Charles A. G. Pritchard, Parma, Ohio, assignor to Eugene W. Lehman, East Cleveland, Ohio Application May 18, 1944, Serial No. 536,205

6 Claims. (Cl. 24—81)

The invention relates to clamping means, such as are serviceable in wire-clamping tools, and particularly to a means of this character for leak-proofedly clamping a fabric hose section or a salvageable portion of a damaged hose to a metal or rigid tubular hose coupling.

The objects of the invention are to provide clamping means of the stated character which can be cheaply made, can be conveniently operated, will effect the desired function in a minimum of time, and which will effect a leak-proof and dependable connection between the hose and coupling.

The annexed drawings and the following description set forth in detail certain means illustrating the improvements in clamping means, such disclosed means constituting, however, only one of the various forms in which the principle of the invention may be embodied.

Figure 1:
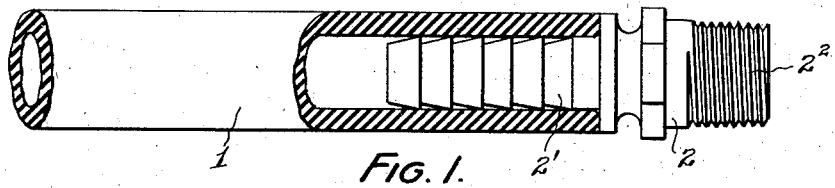
Figure 1 is a partial axial section and a partial elevation of a fragmentary section of fabric hose into one end of which extends a stepped end of a metal coupling upon which a tool having the instant improved clamping means is designed to leak-proofedly clamp the hose end.
Figure 2:
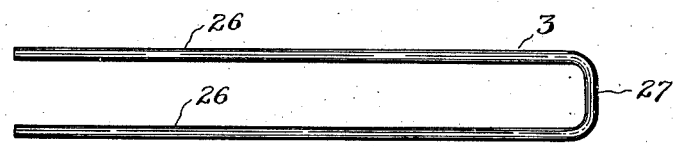
Figure 2 is a view of an elongated U-shaped wire clamp upon which the tool shown in Fig. 3 operates to effect the desired clamping together of the hose section and coupling.
Figures 3, 4, 10:
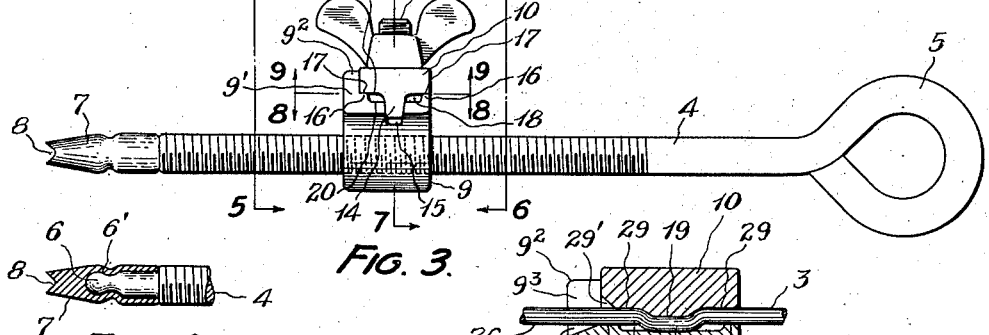
Figure 3 is a side elevation of the clamping tool.
Figure 4 is an axial section of one end of the tool shown in Figure 3, this view particularly showing a grooved jaw end of the tool swively mounted upon the main stem of the tool, a fragmentary portion of which main stem is also shown, in elevation.
Figures 5, 6, 7:
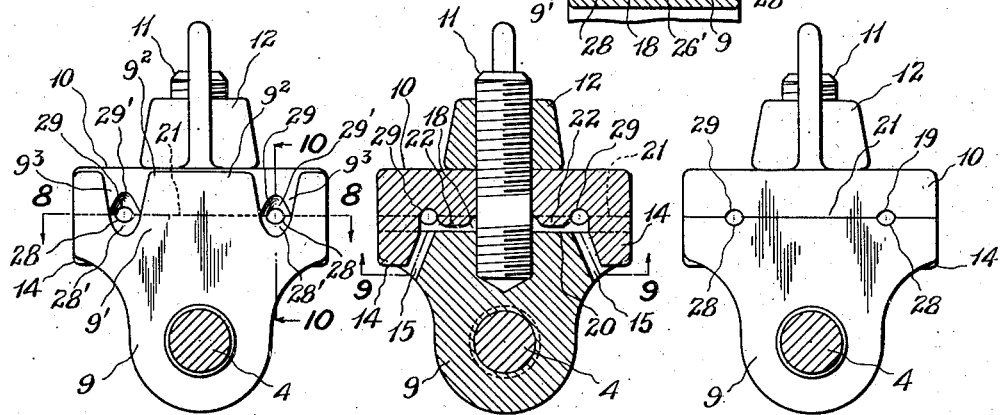
Figure 8:
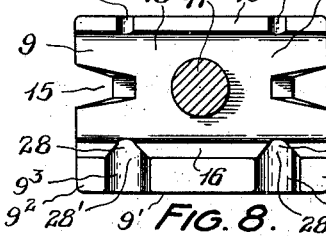
Figure 9:
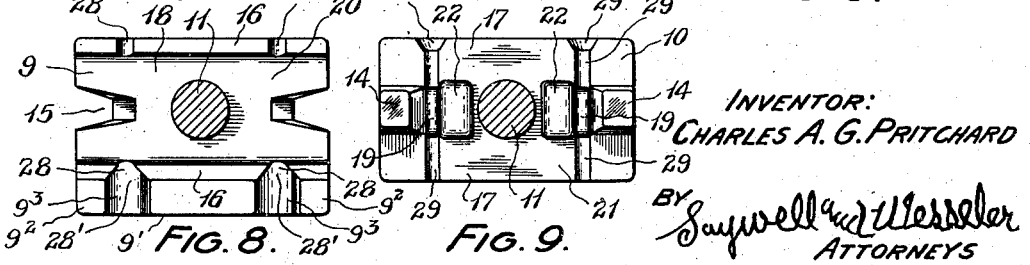
Figure 12:
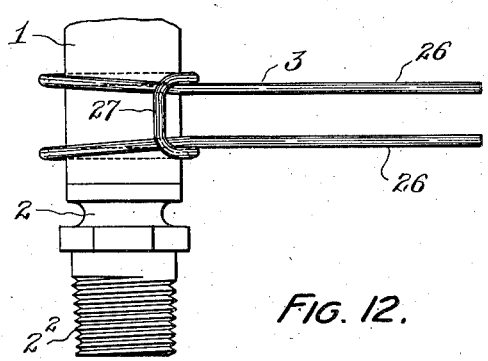
Figure 11:
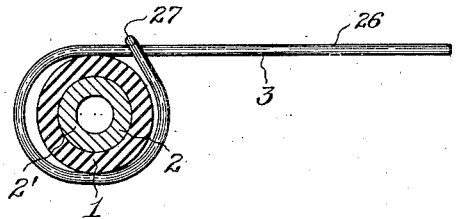
Figure 14:
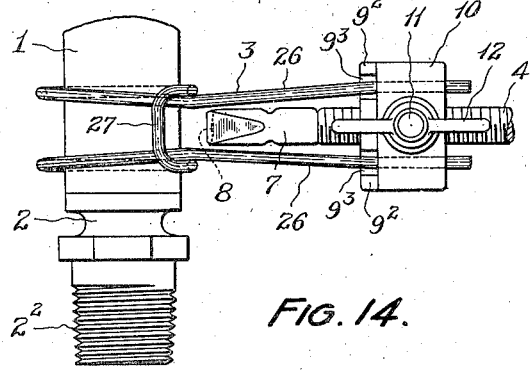
Figure 13:
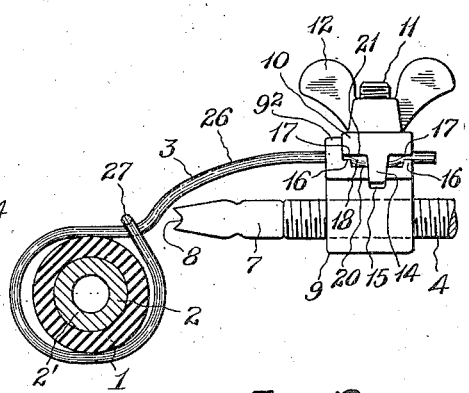
Figure 16:
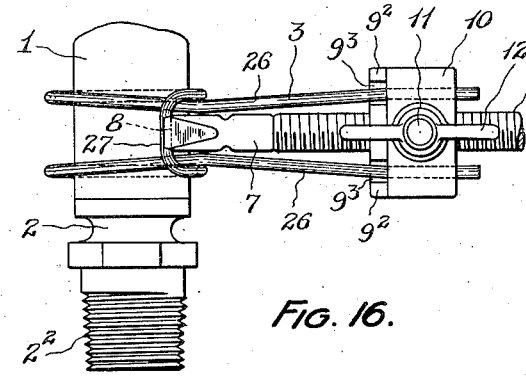
Figure 15:
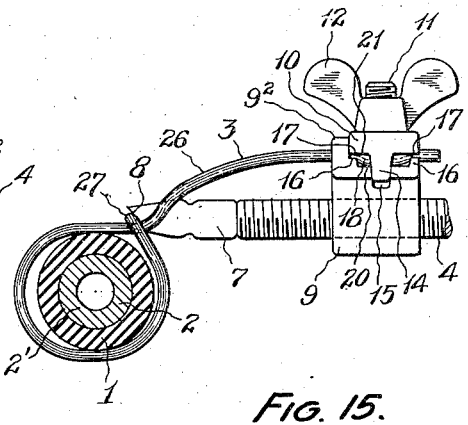
Figure 17:
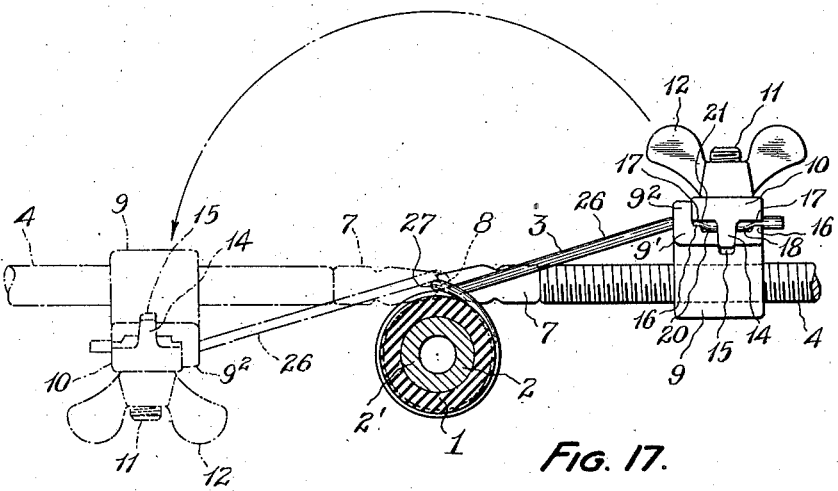
Figure 18:
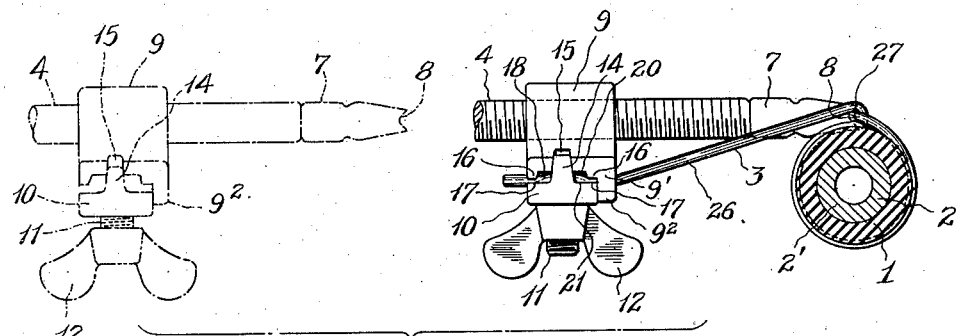
Figures 19, 20:
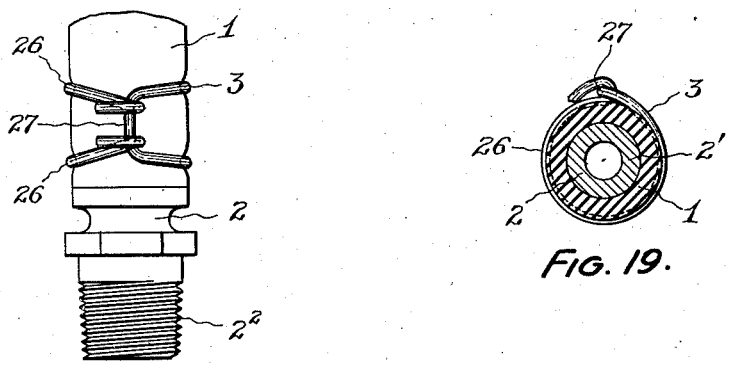

Figures 5 and 6 are elevations, upon an enlarged scale, of the two sides of the improved clamping means, the views being taken, respectively, from the planes indicated by the lines 5—5 and 6—6, Figure 3;

Figure 7 is a transverse section, upon an enlarged scale, taken in the plane indicated by the line 7—7, Figure 3, which plane is centrally of the wire-clamping block;

Figures 8 and 9 are, respectively, a top plan of the body and a bottom plan of the cap of which the clamping block is comprised, these views being upon an enlarged scale, and taken, respectively, from the planes and in the respective directions indicated by the lines 8—8 and 9—9, Figure 3, the planes from which the views are taken being also particularly respectively indicated in Figures 5 and 7;

Figure 10 is a section, taken in the plane indicated by the line 10—10, Figure 5, and showing a fragmentary portion of one of the legs of the U-shaped clamping wire clamped between the body and cap of the clamping block shown in Figures 5-9;

Figures 11 and 12 are, respectively, a transverse section and a plan view of the hose section and coupling assembly shown in Figure 1 after the U-shaped clamping wire shown in Figure 2 has been bent around the hose and coupling assembly and had its two legs passed by and under its base portion, thus to be loosely mounted on the hose and coupling assembly, as clearly appears in these figures;

Figures 13 and 14 are, respectively, an elevation and a plan view of the clamping tool brought into proximity to the loose hose, coupling, and wire assembly shown in Figures 11 and 12, with the jaw end of the tool directed toward the base of the clamping wire and somewhat spaced therefrom, the legs of the clamping wire having during this operation been passed through the clamping block intermediate the separated cooperating faces of the body and cap thereof, and then the body and cap of the clamping block tightly clamped by a tightening movement of the cap thereof, to lock the wire legs securely therebetween;

Figures 15 and 16 are, respectively, an elevation and a plan view of the elements shown in Figures 13 and 14 after a screw-threaded stem of the clamping tool has been fed forwardly through the clamping block, the body of which is formed with a threaded hole therethrough for this purpose, this forward feeding of the tool stem causing the grooved jaw of the swiveled end of the tool stem to engage the base of the U-shaped clamping wire;

Figure 17 is an elevation of the elements shown in Figures 15 and 16 after the threaded stem of the clamping tool has been fed further forwardly and sufficiently to cause the grooved jaw thereof to draw the legs of the U-shaped clamping wire into engagement with the hose section and bind it securely to the coupling, the arcuate path of travel indicated by the arrow above this Figure 17 indicating a subsequent manipulation of the clamping tool which results in a functioning thereof and a positioning thereof relatively to the clamped coupling hose, as shown in dot-and-dash lines in said Figure 17;

Figure 18 is a full line elevation similar to the dot-and-dash showing of Figure 17, i. e., a showing after the clamping tool has been turned, upon the base of the U-shaped wire as an axis, through an angle of about 180° over and to the other side of the clamped hose coupling, thereby somewhat to compress the hose section by the clamping wire and to set the tightly clamped condition of the latter upon the hose, a dot-and-dash showing of the clamping tool in this Figure 18 showing the same after the legs of the U-shaped wire have been loosened in the clamping block by a backing off of a clamping wing nut, and the tool has been pulled off the loosened extending wire leg ends; and Figures 19 and 20 are, respectively, a cross-section and a plan view of the wire-clamped hose and coupling after the surplus portions of the legs of the clamping wire have been snipped off and the clamped hose and coupling are in final finished condition.

Referring to the annexed drawings in which the same parts are indicated by the same respective numbers in the several views, 1, Figure 1, indicates a section of hose, 2 a rigid tubular coupling having a stepped end 2¹ and a threaded end 2², and 3, Figure 2, a U-shaped wire clip, which by the clamping tool having the improved clamping means herein presented is tightly bent around the hose 1, when the hose 1 and coupling 2 are loosely assembled in the manner shown in Figure 1, so as to rigidly secure together the hose 1 and coupling 2 into an assembly shown in Figure 18.

The coupling tool includes a stem 4, Figure 3, which is exteriorly threaded for a considerable portion of its length, is formed with a looped end 5 by which it may be manipulated, and has an opposite ball end 6, Figure 4, forming a shoulder 6¹ by means of which a jaw member 7 is rotatably mounted upon the ball end 6, the jaw member 7 having an outer end wire-receiving cross groove 8.

The rod 4 has screw-threaded engagement with the lower body part 9 of a two-part wire-clamping block 9—10, Figures 5–9 embodying the improved clamping means, of which the upper part 10 is of cap formation, the body 9 and cap 10 having complementary opposed clamping face formations, a pin 11 being secured in the lower body part 9, and having an exteriorly-threaded upwardly-extending portion upon which the upper cap part 10 is loosely mounted and from the top of which upper cap part 10 the pin 11 extends. The block body 9 and cap 10 are held in assembly, and locked together and unlocked, by a wing nut 12 having screw-threaded engagement with the extended upper end of the pin 11, Figures 3 and 7.

The upper cap part 10, Figures 3, 7, and 9, is formed with downwardly-extended end lugs 14 on its lower face, which lugs 14 are downwardly tapered on their two sides and on their inner faces and which are complementary to tapered end recesses 15 formed in the lower body part 9, Figures 3 and 8, so that the body 9 and cap 10 can be mated, Figures 3, 5, and 6, and then held in mated position by the wing nut 12. The lower body part 9 is formed with upwardly-extended side flanges 16, Figures 3 and 8, which, in the mated postion of the body 9 and cap 10 shown in Figures 6 and 7, engage the side surface portions 17 of the lower face of the upper cap part 10 to form a recess 18, Figures 3, 7, and 10, between the opposed faces of the body part 9 and cap 10 and interiorly of the upwardly-extended flanges 16.

During the use of the improved clamping tool, the legs 26 of the U-shaped wire clip 3 are locked intermediate their ends between the body 9 and cap 10 of the clamping block, Figures 13 and 14. In such locking of the U-shaped clip 3, the legs 26 are disposed in mated surface grooves formed in the opposed faces of the body 9 and cap 10, the grooves in the body 9 being indicated by 28, Figure 8, and the grooves in the cap 10 being indicated by 29, Figure 9, the grooves 28 being formed in the upwardly-extended side flanges 16, and the grooves 29 being extended across the entire lower face 21 of the cap part 10 except as interrupted in the manner hereinafter mentioned. These grooves 28 and 29 at one side of the body 9 and cap 10 are flared outwardly, as indicated by 28¹ and 29¹, respectively, Figures 5, 8, and 9, whereby to provide a finder for an easy insertion of the ends of the legs 26 of the wire clip 3 when inserting the wire clip 3 into the grooves 28 and 29 preliminary to the passing of the said clip legs 26 through the clamping block and between the body 9 and cap 10 thereof and then the subsequent tightly securing of the wire legs 26 between the block parts. These flared grooved portions 28¹ and 29¹ are formed on that clamping block side nearer the swiveled jaw end 6 of the tool stem 4.

Further means are provided for assisting in ready and convenient insertion of the legs 26 of the wire clip 3 into the grooves 28 and 29. These means comprise a thickened front portion 9¹ of the clamping block body 9, Figures 8 and 10, i. e., a thickened body portion 9¹ upon the side of the body nearer the swiveled jaw end 6 of the tool stem 4, which thickened body portion 9¹ has an upwardly-directed flange 9², Figures 5 and 10, extended upwardly beyond the adjacent side flange 16 and having slots 9³ therethrough of material width with open upper ends and upwardly-flared walls, the lower portions of which slots register with the grooves 28 and 29. When inserting the ends of the legs 26 of the wire clip 3, it is necessary only to drop these leg ends into the tops of the slots 9³ whence they are readily guided into alignment with the flared grooved portions 28¹ and 29¹ of the respective grooves 28 and 29.

Means are provided whereby, during the clamping of the wire legs 26 between the block body 9 and cap 10, portions of the legs 26 between the body 9 and cap 10 are distorted, so as to prevent a direct and straight pull upon the same during the hose clamping operation, whereby to obviate the pulling of said clip legs out of the block. Such wire distorting means are formed by downwardly-extended central portions 19 formed on and adjacent the ends of the lower face 21 of the cap part 10, Figures 9 and 10, which downwardly-extended portions 19 interrupt the continuity of the grooves 29 substantially centrally of the ends of the latter so that, upon the clamping together of the body 9 and cap 10, the wire leg portions 26¹, Figure 10, are distorted and forced into the lower part of the recess 18 formed between the body 9 and cap 10, and against the central upper face portion 20 of the body 9. Thus, the wire legs 26 are positively locked between the body 9 and cap 10 by a snubbing effect which prevents their being pulled out of the clamping block parts 9 and 10. In order that during the use of the improved clamping means, the distorted and locked leg portions 26¹ may not be forced inwardly into a larger section of the recess 18 and thus possibly unduly loosened, the lower face 21 of the cap part 10 is formed with downwardly-extended abutments 22, Figures 7 and 9, immediately adjacently interior of the downwardly-extended portions 19.

The use of the improved clamping means for hose-clamping purposes is illustrated in Figures 11–20. First, the hose section 1 and the coupling 2 being assembled as shown in Figure 1, the wire clip 3 is bent around the assembled hose 1 and coupling 2, Figures 11 and 12, the base portion 27 of the clip 3 being positioned at about the level of the top of the hose 1, and at one side thereof, and the free ends of the wire legs 26 being passed between the other ends thereof and below the base wire part 27. Thus, the hose coupling assembly 1—2 is loosely encircled by the bent clip 3. Then the free ends of the wire legs 26 are passed into the mated grooves 28 and 29, such passage being readily and easily effected through the medium of the slots $9^3$ and the flared groove portions $28^1$ and $29^1$, the jaw 7 of the screw rod 4 being directed toward the base wire part 27, and positioned some distance therefrom, Figures 13 and 14. Then the body 9 and cap 10 are tightened by the wing nut 12, Figures 13 and 14. Then feeding of the screw stem 4 forwardly by the manipulative end 5 brings the swiveled jaw 7 into juxtaposition with the base wire part 27 and the end groove 8 of the swiveled jaw 7 is caused to engage this base wire part 27, Figures 15 and 16. Then, further feeding of the screw stem 4 moves the base wire portion 27 forwardly and over the hose 1 drawing the adjacent portion of the wire legs 26 encircling the hose 1 into gripping engagement with the latter, as indicated in full lines in Figure 17. In order to lock or set the clamping together of the hose section 1 and the coupling 2, the clamping tool is swung upwardly and downwardly through a total movement of about 180° (arrow, Figure 17), upon the base wire part 27 as an axis, into the position indicated by the dot-and-dash line showing, Figure 17, and full line showing, Figure 18, thus causing the clamping wire to effect an indenting engagement with the hose 1. Then, a loosening of the cap 10 from the body part 9 permits a pulling off of the clamping tool from the extended wire leg portions, dot-and-dash showing, Figure 18. This completes the clamping work and the operation is placed in finished condition by snipping off the unnecessary portions of the wire legs 26, Figures 19 and 20.

The snubbing and locking, as shown, of the wire legs 26 between the clamping block parts 9 and 10 also serves to keep the wire leg portions which are bent around the hose-coupling assembly 1—2 in a loose condition until the base portion 27 of the wire clip 3 is fed over the assembly 1—2 far enough to effect the engagement of the wire legs 26 with the entire circumference of the assembly 1—2, thus preventing any premature binding of parts of the wire legs 26 upon the assembly 1—2 which would tend to make the clamping operation more difficult and to impair the effectiveness of the operation.

The downwardly-extended end lugs 14 on the lower face of the upper cap part 10 of the clamping block assist in guiding the legs 26 of the wire clip 3 into and through the mated grooves 28 and 29, an assistance which is very important to the ready and convenient insertion of the wire legs, inasmuch as the body 9 and the cap 10 are somewhat separated during this operation and the surface grooves 28 and 29 are not tightly mated. Also, if this separation of the body 9 and cap 10 is effected to a considerable extent, possibly being accidentally or carelessly effected to an extent greater than is necessary for an insertion of the wire legs 26, a functioning of the upwardly-extended flange $9^2$ of the body 9 as a guide for causing the cap 10 to assume the proper position for the subsequent locking engagement of the cap 10 is important, inasmuch as without this guiding action effected by the flange $9^2$, some additional manipulation of the cap 10 to effect the locking thereof to the body 9 might be necessary.

What I claim is:

1. Clamping means comprising a two-part clamping block having complementary mating faces, one of said block parts being formed to provide a feeding support for an actuating member, locking means for holding the block parts together in mated relation, one of said block parts having an extended flange overlapping the side portions of the other block part, complementary wire-receiving grooves formed in the opposed faces of the block, said extended flange being formed with open-ended slots having flared walls and disposed in alignment with one end of the complementary wire-receiving grooves, and wire-snubbing extensions formed on one of the block parts and interrupting the continuity of the wire-receiving grooves.

2. Clamping means comprising a two-part clamping block having complementary mating faces, one of the block parts being formed with a threaded bore, locking means for holding the block parts together, complementary wire-receiving grooves formed in the opposed faces of the block, one of said faces being formed with wire-snubbing extensions interrupting the continuity of the wire receiving grooves, the block parts being formed to provide an enlarged recess therebetween when in mated relation, the wire-receiving grooves intersecting the recess, one of the block parts being formed with abutments intersecting said recess and disposed adjacent the wire-snubbing extensions, the wire-receiving grooves being formed with flared enlargements at one end, and one block part enclosing a side surface of the other block part and formed with open-ended flaring slots in alignment with the flared end portions of the wire-receiving grooves.

3. Clamping means comprising a two-part clamping block having complementary mating faces, locking means for holding the block parts together, one of the block parts being formed with extended flanges engaging opposed side face portions of the other block part, aligned grooves formed in the flanges, the grooves of one flange being enlarged, complementary grooves formed in the other block part and extended thereacross, extensions formed on said other block part and interrupting the continuity of its grooves, said block parts being formed to provide a recess therebetween when in mated relation, said extensions intersecting said recess, and abutments formed on one block part and extended into said recess adjacent said extensions, the flanged block part having a thickened portion adjacently exteriorly of one of said flanges and formed with open-ended flared slots in alignment with said grooves.

4. Clamping means comprising a two-part clamping block having complementary mating faces, said block being formed to engage a screw-threaded actuating member, a pin secured in one block part and having an exteriorly-threaded portion extended therefrom, such extended pin portion loosely passing through the other block part, a wing nut engaging the threaded portion of the pin exteriorly of said "other block part," complementary wire-receiving grooves formed in the opposed faces of the block, one of said faces being formed with portions extended toward the mating face of the opposed block part and interrupting the continuity of the wire-receiving grooves of said "one" face, said block parts being formed to provide a recess therebetween when in mated relation, said "one" block face having other portions extended toward the mating face of the opposed block part and disposed laterally adjacent said first-mentioned extended portions, both sets of said extended portions intersecting the recess, one block part having side flanges extended therefrom respectively engaging opposed side face portions of the other block part, said last-mentioned "one block part" also having a thickened side body portion with a flange extended beyond its aforementioned side flange and having flared open-ended slots aligned with the wire-receiving grooves, the ends of the wire-receiving grooves in alignment with said slots being enlarged.

5. Clamping means comprising a two-part clamping block having complementary mating faces, locking means for holding the block parts together in mated relation, one block part having side flanges engaging the side surface portions of the mating face of the other block to form a recess interiorly of the flanges and between the opposed mated faces, the opposed mating faces being formed with complementary wire-receiving grooves, the wire-receiving grooves intersecting the recess, one block part being formed with wire-snubbing extensions interrupting the continuity of the wire-receiving grooves of said block part to divert wire portions into another part of the recess, and abutments formed on said one block part and extended into the recess and disposed adjacent the snubbing extensions.

6. Clamping means comprising a two-part clamping block having complementary mating faces, locking means for holding the block parts together in mated relation, one block part having side flanges engaging the side surface portions of the mating face of the other block to form a recess interiorly of the flanges and between the opposed mated faces, the opposed mating faces being formed with complementary wire-receiving grooves, the grooves of one block part consisting of opposed groove sections formed in the said flanges, and the grooves of the other block part extending continuously thereacross, the last-mentioned grooves intersecting the recess, the last-mentioned block part being formed with wire-snubbing extensions extended into its wire-receiving grooves to divert wire portions into another part of the recess, and abutments formed on said last-mentioned one block part and extended into the recess and disposed adjacently interiorly of the snubbing extensions.

CHARLES A. G. PRITCHARD.

REFERENCES CITED

The following references are of record in the file of this patent:

UNITED STATES PATENTS

| Number | Name | Date |
|---|---|---|
| 1,846,444 | Birkenmaier | Feb. 23, 1932 |
| 685,253 | Caldwell | Oct. 29, 1901 |
| 1,223,710 | Mattson | Apr. 24, 1917 |
| 2,013,437 | Farrell | Sept. 3, 1935 |
| 2,044,679 | Frese | June 16, 1936 |
| 1,319,746 | Zeller | Oct. 28, 1919 |
| 1,453,940 | Lowrey | May 1, 1923 |
| 1,783,123 | Kiviaho | Nov. 25, 1930 |

FOREIGN PATENTS

| Number | Country | Date |
|---|---|---|
| 572,264 | France | Feb. 18, 1924 |